(12) United States Patent
Cerami et al.

(10) Patent No.: US 8,976,227 B2
(45) Date of Patent: Mar. 10, 2015

(54) SYSTEM AND METHOD FOR INITIATING VIDEO PHONE CALLS

(75) Inventors: Rich Cerami, Denver, CO (US); John M. Verbil, Scottsdale, AZ (US)

(73) Assignee: CenturyLink Intellectual Property LLC, Denver, CO (US)

( * ) Notice: Subject to any disclaimer, the term of this patent is extended or adjusted under 35 U.S.C. 154(b) by 380 days.

(21) Appl. No.: 13/528,482

(22) Filed: Jun. 20, 2012

(65) Prior Publication Data

US 2013/0342630 A1    Dec. 26, 2013

(51) Int. Cl.
*H04N 7/14* (2006.01)
(52) U.S. Cl.
USPC ............... 348/14.11; 348/14.01; 370/259; 379/201.01
(58) Field of Classification Search
USPC ............... 348/14.01–14.16; 370/259–271, 370/351–357; 709/201–207, 217–248
See application file for complete search history.

(56) References Cited

U.S. PATENT DOCUMENTS

| | | | | |
|---|---|---|---|---|
| 5,754,641 A * | 5/1998 | Voit et al. | ....................... | 379/354 |
| 5,963,864 A * | 10/1999 | O'Neil et al. | ................. | 455/445 |
| 6,100,918 A * | 8/2000 | Lu | ............................... | 348/14.08 |
| 6,545,697 B1 * | 4/2003 | Parker et al. | ................ | 348/14.01 |
| 6,750,896 B2 * | 6/2004 | McClure | ..................... | 348/14.01 |
| 6,750,897 B1 * | 6/2004 | Moshrefi et al. | ............ | 348/14.08 |
| 7,283,154 B2 * | 10/2007 | Shachar et al. | ............. | 348/14.08 |
| 7,412,043 B2 * | 8/2008 | Horvath et al. | ........... | 379/201.01 |
| 8,379,632 B2 * | 2/2013 | Cattani et al. | .................. | 370/352 |
| 8,488,591 B2 * | 7/2013 | Miali et al. | ..................... | 370/352 |
| 2005/0031092 A1 * | 2/2005 | Umemura et al. | .......... | 379/88.13 |
| 2006/0041648 A1 * | 2/2006 | Horvitz | .......................... | 709/220 |
| 2006/0062371 A1 * | 3/2006 | Vanderheiden et al. | . | 379/211.02 |
| 2007/0201646 A1 * | 8/2007 | Metcalf | ..................... | 379/142.01 |
| 2008/0309753 A1 * | 12/2008 | Karnalkar et al. | .......... | 348/14.11 |
| 2010/0083333 A1 * | 4/2010 | Mizosoe et al. | .............. | 725/118 |

* cited by examiner

*Primary Examiner* — Hemant Patel
(74) *Attorney, Agent, or Firm* — John W. Branch; Lowe Graham Jones PLLC

(57) ABSTRACT

The disclosed embodiments include a system and method for initiating a video phone call using a standard phone device. For instance, in one embodiment, a method for initiating a video phone call from a first party to a second party is disclosed. The method includes receiving a call from the first party. The call is initiated using a standard phone device. The method determines whether the call is a voice call or a call request to initiate a video call. In response to a determination that the call is a call request to initiate a video call, the method terminates the call, initiates a call to a video phone device of the first party and also a communication device of the second party. The method establishes a communication session between the video phone device of the first party and the communication device of the second party.

20 Claims, 3 Drawing Sheets

SYSTEM AND METHOD FOR INITIATING VIDEO PHONE CALLS

BACKGROUND OF THE INVENTION

1. Field of the Invention

The present invention relates generally to systems and methods for providing communications, and more particularly to one or more systems and methods for initiating video phone calls.

2. Discussion of the Related Art

Video phone calls have become ubiquitous in today's society enabling people to remotely communicate simultaneously using both video and audio. For instance, a user may utilize a computer, laptop, or tablet device for initiating and communicating through video phone calls. However, older generations or non-technical/non-Internet savvy people may find this process too complicated and simply rely on the standard landline phone devices for making phone calls.

The disclosed embodiments seek to provide solutions or improvements for enabling non-technical people to utilize their standard landline telephones for initiating video phone calls.

SUMMARY OF THE INVENTION

The disclosed embodiments include a system and method for initiating a video phone call using a standard phone device. In one embodiment, a method for initiating a video phone call from a first party to a second party includes receiving a call from the first party. The call is initiated using a standard phone device. The method determines whether the call is a voice call or a call request to initiate a video call. In response to a determination that the call is a call request to initiate a video call, the method terminates the call, initiates a call to a video phone device of the first party and also to a communication device of the second party. The method establishes a communication session between the video phone device of the first party and the communication device of the second party.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
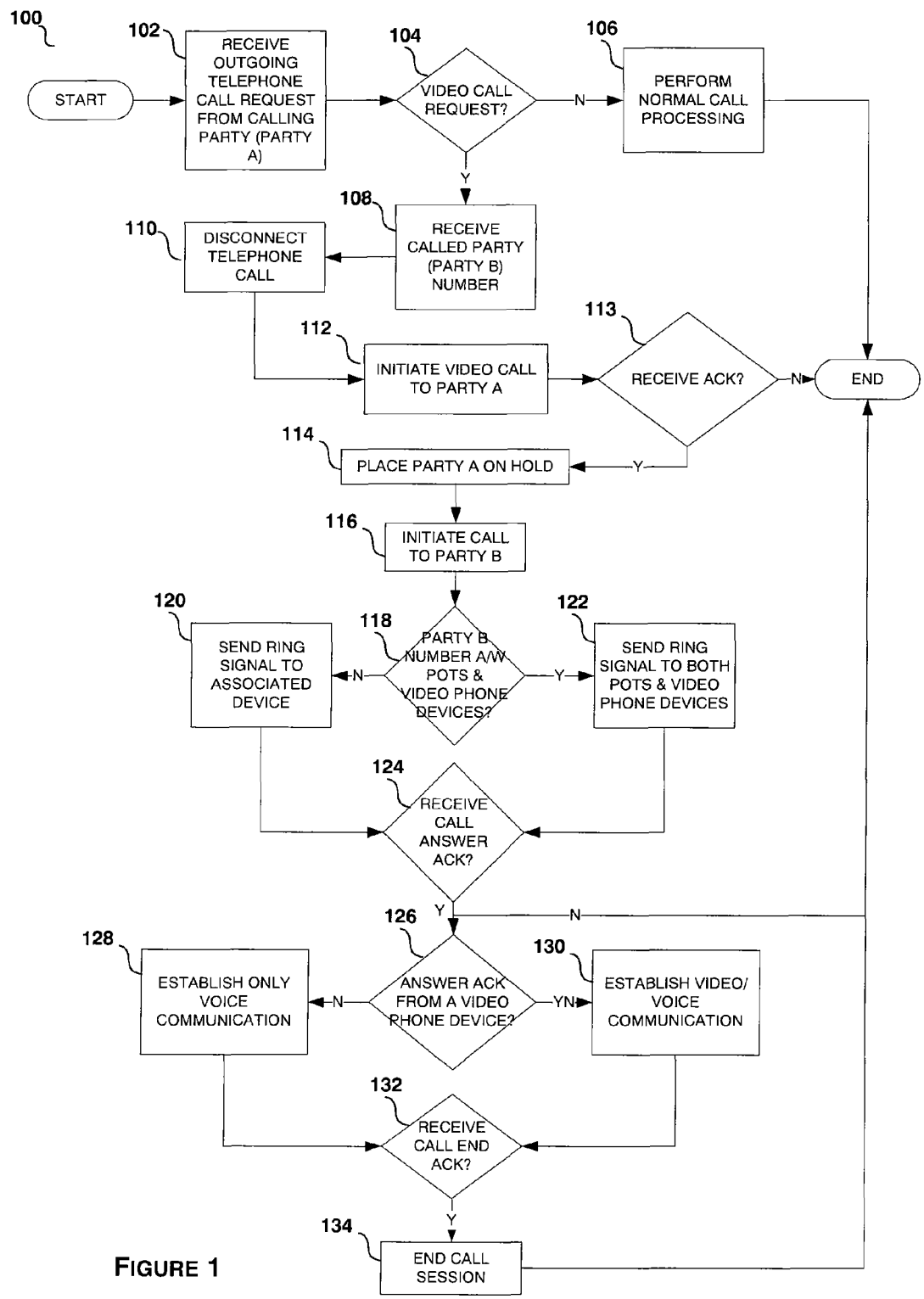
FIG. 1 illustrates an example of a flowchart depicting a process for initiating video phone calls utilizing a standard phone device in accordance with the disclosed embodiments.
Figure 2:
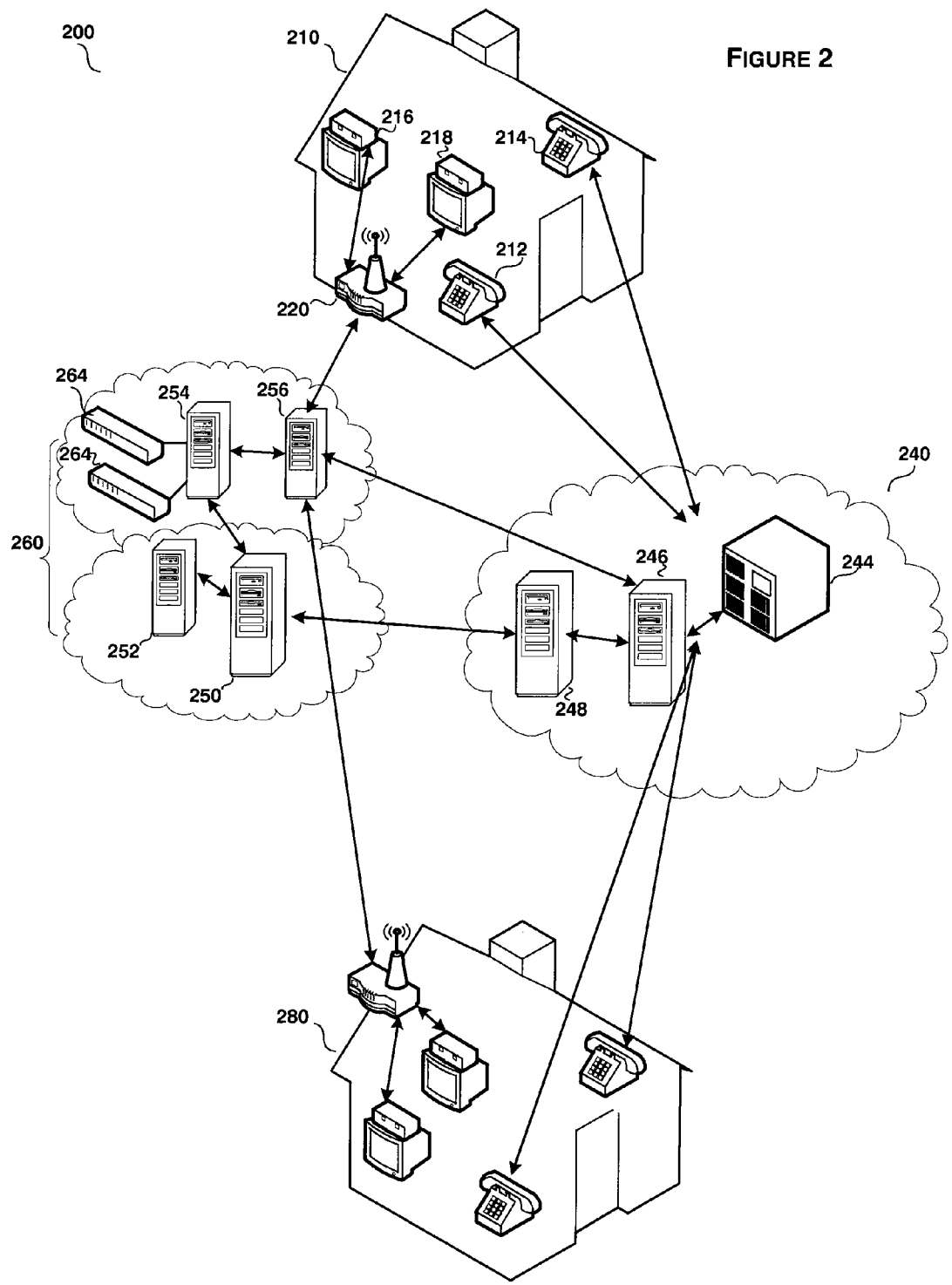
FIG. 2 illustrates an example of a network environment in accordance with the disclosed embodiments.
Figure 3:
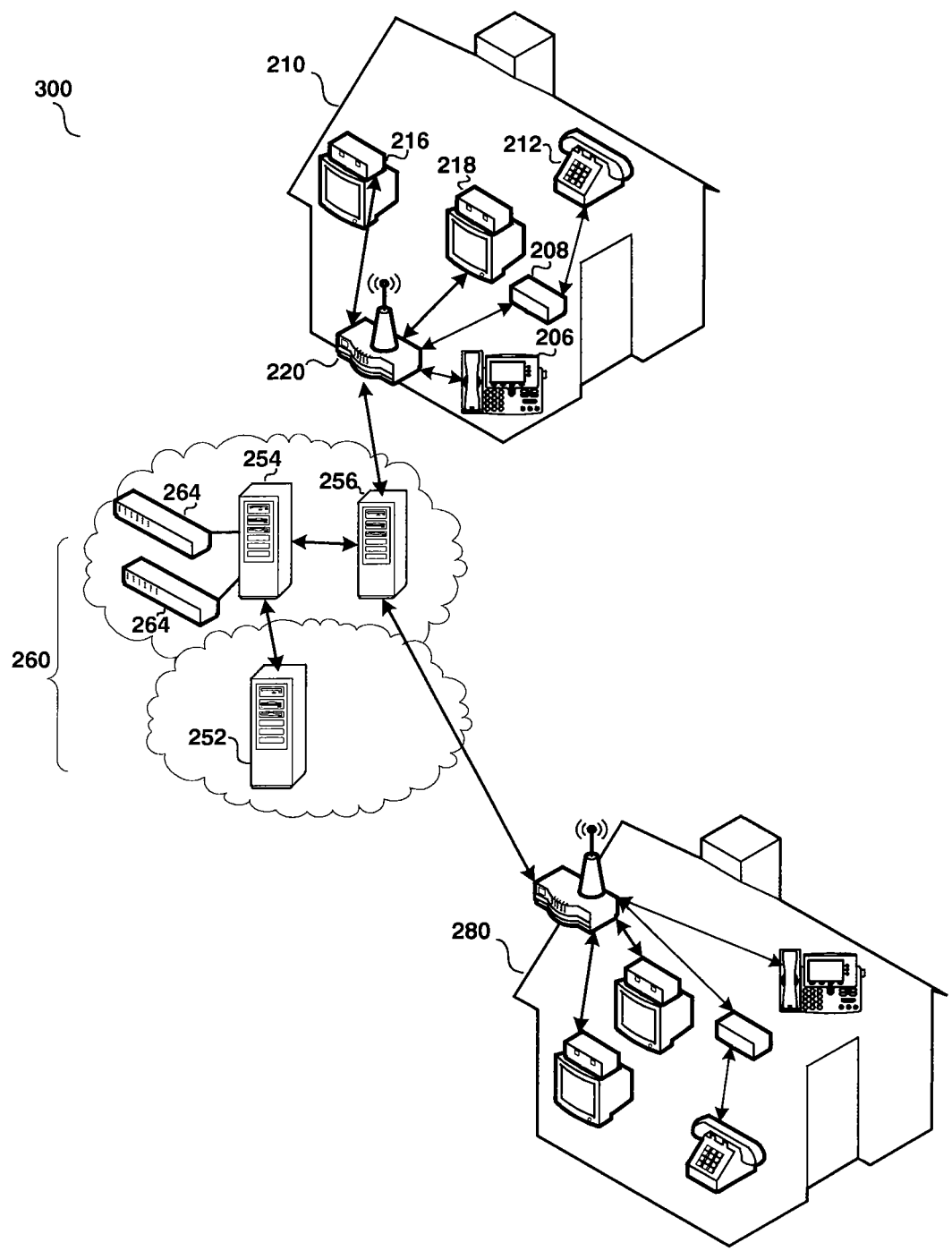
FIG. 3 illustrates a second example of a network environment in accordance with the disclosed embodiments.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Beginning with FIG. 1, an example of a flowchart depicting a process 100 for initiating video phone calls utilizing a standard phone device is presented in accordance with the disclosed embodiments. As referenced herein, a standard phone device means a communication device that is not capable of communicating via video calls. The standard telephone may include analog, digital, and VOIP telephony. The process begins by receiving an outgoing phone call request from a calling party (also referred herein as party A) at step 102. The calling party is a user that is initiating a phone communication. In this embodiment, the user initiates the call request utilizing a standard phone that is configured to communicate over the plain old phone service (POTS) wire line phone network.

At step 104, the process determines whether the outgoing phone call request is for regular voice communication or whether the outgoing phone call request is for initiating a video phone call. For instance, in one embodiment, a user may dial *TV (i.e., *88), *VC (video calls), which is equivalent to (*82), or any other predetermined code/identifier that indicates a request for initiating a video phone call. If the process determines that the outgoing phone call request is for regular voice communication, the process, at step 106, performs normal call processing for establishing the voice communication session with a called party.

However, if the process determines that the outgoing phone call request is for initiating a video phone call, the process at step 108 receives a phone number or identifier associated with a called party (also referred herein as party B). In one embodiment, the process may initiate a second dial tone for receiving the phone number. A message may also be played to request that the user enter the phone number.

After receiving the phone number or identifier, the process, at step 110, disconnects the current phone communication session. In one embodiment, the process may automatically disconnect call. In another embodiment, the process may play a message requesting that the user hang up the standard phone device and answer a video phone device when it starts ringing. The video phone device may be any communication device operable to provide video and audio communication. The video phone device may also include a camera and a microphone for capturing audio and video communication. For example, in one embodiment, the video phone device may be a TV phone box that provides a network connection for receiving video and audio communication. The TV phone box is attached to a TV or other display device for enabling audio and video communication.

At step 112, the process initiates a video call to at least one video phone device associated with the calling party. The process determines whether the video call is answered at step 113. If the video call is not answered, the process ends. If the video call is answered, the process places the calling party on hold at step 114. A message may be played to indicate that the calling party is being placed on hold while the called party is being reached.

The process initiates a call to the called party (Party B) at step 116. In one embodiment, the process determines at step 118 whether the phone number or identifier associated with the called party is associated with both standard phone devices and video phone devices. For instance, a service provider may assign a universal number to a subscriber that is utilized by people trying to call the subscriber. The service provider may link the universal number to different call identifiers associated with one or more communication devices of the subscriber to enable the service provider simultaneously ring one or more of the communication devices in response to receiving a call to the subscriber.

If the process determines that the phone number/identifier is associated only with standard phone devices or only with video phone devices, the process at step 120 sends a ring signal to the determined devices. If the process determines that the phone number/identifier is associated with both standard phone devices and video phone devices, the process at step 122 may send a ring signal to all devices simultaneously.

At step 124, the process determines whether the call to the called party is answered. If the call is answered, the process at step 126 determines whether the call was answered by a standard phone device or by a video phone device. If the process determines that the call is answered by a standard phone device, the process at step 128 establishes only voice communication between the calling party and the called party. If the process determines that the call is answered by a video phone device, process at step 130 establishes video and audio communication between the calling party and called party.

The process monitors for a call end acknowledgment at step 132. If the process receives a call end acknowledgment, the process terminates the call session between the calling party and the called party at step 134, with process 100 terminating thereafter.

Referring now to FIG. 2, an example of a network environment 200 is depicted for initiating video phone calls utilizing a standard phone device in accordance with one embodiment. In the depicted embodiment, a location 210 has a plurality of communication devices including standard phone devices (212, 214) and video phone devices (216, 218). Location 280, not described in detail, depicts similar communication devices as location 210 for initiating voice calls and video calls.

The video phone devices 216 and 218 are communication devices that are capable of receiving both audio and video communication over an Internet Protocol (IP) network. The video phone devices 216 and 218 may be device that is connected to display device such as, but not limited to, to a television. Alternatively, the video phone devices 216 and 218 may be a device having an integrated display and audio input/output components. The video phone devices 216 and 218 may be configured to communicate via wired or wireless means with a router/access point 220 for enabling the video phone devices 216 and 218 to send and receive data over an IP network.

In this embodiment, the standard phone devices 212 and 214 are wired communication devices that are operable to communicate via a POTS wire line phone network 240. The POTS wire line phone network 240, also commonly referred to as the public switched phone network (PSTN), comprises the world's public circuit-switched phone networks that are inter-connected by switching centers to enable any phone in the world to communicate with any other.

The POTS wire line phone network 240 includes a switch 244. The switch 244 may be a class 5 switch that is deployed at a central office (CO) of a service provider for providing local and long distance telephony services. In accordance with the disclosed embodiments, the switch 244 may be specially configured to identify a call request from a standard phone device to initiate a video call (e.g., identifying all *TV calls) and route calls identified as video calls to a Service Control Point (SCP) 246 for further processing to initiate the video call. In an alternative embodiment, an off-hook delay trigger can capture all outbound calls and allow the SCP 246 to determine if the dialed string is a video request call from a standard phone device. Calls not identified as a call request to initiate a video call (i.e., regular phone calls) are processed as usual by the switch 244.

The SCP 246 is configured to provide services such as service creation, session control and protocols for enabling the standard phone devices to initiate video phone calls. The SCP 246 bridges the communication between the POTS wire line phone network 240 with other technological or network domains in order to utilize cross-platform network applications. For instance, in one embodiment, the SCP 246 communicates with an Enhanced Services Gateway (ESG) 248 to convert legacy POTS messaging to standard IP-based protocols. In the depicted embodiment, the ESG 248 communicates with a Service Capability Interaction Management (SCIM) platform 250 that provides service capability interaction management for services from different domains such as between the POTS wire line phone network 240 and an IP Multimedia Subsystem (IMS) network 260. The ESG 248 may be configured to communicate with the SCIM platform 250 using Parlay, which is a set of specifications for industry-standard application programming interfaces (APIs) for managing network "edge" services such as call control, messaging, and content-based charging. The ESG 248 may also be configured to communicate with the SCIM platform 250 using Session Initiation Protocol (SIP).

The SCIM platform 250 is operable to interact with one or more Applications Servers for providing different services. For instance, in accordance with the disclosed embodiments, the SCIM platform 250 may communicate with an Application Framework (AF) SIP Server 252 for translating and correlating PSTN numbers into SIP addresses. A SIP address is an identifier (e.g., john.smith@212.123.1.213) that is associated with a communication device that enables calls to be made to the communication device using SIP (i.e., voice over IP calls). For instance, the AF SIP Server 252 may communicate with a database and/or may store data that correlates the SIP addresses of a subscriber's communication devices capable of receiving IP calls to the subscriber's PSTN number. This information may be utilized to ring-back the caller's video phone devices 216 and 218 for initiating the video call as described in FIG. 1. This information may also be used to simultaneously ring all communication devices (i.e., IP communication devices and PSTN communication device) of a called subscriber in response to receiving a video call to the subscriber.

In an alternative embodiment, the ESG 248 may be configured to communicate directly with the one or more applications servers, such as, but not limited to, the AF SIP Server 252. The one or more applications servers may be independent of the IMS network 260 and directly receive the Parlay or SIP requests from the ESG 248.

The SCIM platform 250 may also interact with a Call Session Control Function (CSCF) server 254. The CSCF server 254 is responsible for all signaling via Session Initiation Protocol (SIP) in the IMS network 260. The CSCF server 254 may perform a Domain Name System (DNS) look-up and a Home Subscriber Server (HSS) look-up to determine where to send SIP messages, whether in its own network or another network. The HSS contains subscription-related information (subscriber profiles), performs authentication and authorization of the user, and can provide information about the subscriber's location and IP information. The CSCF server 254 may also be responsible for policy decisions such as determining how much bandwidth to make available to a communication device when it seeks to establish a session. In some embodiments, the CSCF server 254 may act as the first point of contact for the IMS terminals (e.g., the router/access point 220). In other words, the CSCF server 254 may be configured to establish the video call connection with a calling party and/or called party's video phone devices.

Alternatively, in other embodiments, the CSCF server 254 may communicate with a Session Border Controller (SBC) server 256, which acts as the first point of contact for the IMS terminals. The SBC server 256 may be responsible for setting up, conducting, and tearing down phone calls or other interactive media communications. The SBC server 256 may also be configured to provide subscriber authentication, signal inspection, traffic policing for maintaining a QoS policy of a network, compression and decompression, and other services.

The CSCF server 254 may also communicate with one or more media servers 264. The media servers 264 may perform Real-Time Protocol (RTP) media processing for IP-based audio, video, and other applications, such as, but not limited to, VoIP audio and IP video conferencing, media mixing, Multimedia Ringback Tones (MRBT), Interactive Voice and Video Response (IVVR), and IP-to-IP Transcoding.

The network environment 200 illustrated in FIG. 2 and described above enables a standard phone device to initiate a video call through the POTS wire line phone network 240. In contrast to FIG. 2, FIG. 3 illustrates a network environment 300 that enables a standard phone device to initiate a video call without communicating through the POTS wire line phone network 240.

In accordance with the network environment 300, a standard phone device, such as standard phone device 212 is connected to an analog phone adapter (ATA) 208 for enabling it to communicate through the router/access point 220. The standard phone device 212 is then able to initiate regular VOIP calls or may initiate calls to request a video phone call be made (e.g., by dialing *TV or some other pre-specified code or number). In this embodiment, the standard phone device may also be a regular VOIP enabled phone 206 that does not require an external analog phone adapter.

In network environment 300, the calls are not routed through the POTS wire line phone network 240, but instead are routed to the Call Session Control Function (CSCF) server 254 through the Session Border Controller (SBC) server 256. The CSCF server 254 determines whether the call is a regular VOIP call or a call request to initiate a video call. Regular VOIP calls are processed as usual by the CSCF server 254. If a call is identified as a call request to initiate a video phone call, then the CSCF server 254 will initiate the video phone call between at least one of the calling party's video phone devices (e.g., video phone device 216) and a communication device of a called party. In one embodiment, the CSCF server 254 will only ring video phone devices of the called party so that a video call connection may be established. In other embodiments, the CSCF server 254 may simultaneously ring all communication devices associated with a called party. If the call is answered by the called party on a video phone device then the CSCF server 254 will establish a video call session. If the call is answered by the called party on a non-video phone device (i.e., a standard phone device) then the CSCF server 254 will establish just a voice call between the calling party and called party.

In addition, in some embodiments, the CSCF server 254 and/or one or more other devices within network environment 200/300 may be configured to make routing decisions based on one or more video call settings or factors. For example, in one embodiment, the CSCF server 254 may store location information associated with the video phone devices and the standard phone devices of a subscriber. In response to receiving a request to initiate a video phone call from a standard phone device, the CSCF server 254 may be configured to ring back a video phone device located closest to the standard phone device initiating the request (e.g. a video phone in the same room or office as the initiating standard phone device).

Still, in other embodiments, the video phone device may be selected based upon pre-specified user preferences and/or based upon real-time network performance information. For instance, a user may specify a particular video phone device that provides a particular level of video and/or audio quality for video calls to/from a particular party and/or for calls that require a minimum bandwidth level (e.g., a business call or a group call).

Another video call factor may be cost. For example, unimportant calls or calls to/from children within a household may be placed to a low quality/bandwidth video phone device to reduce cost. The CSCF server 254 may also be configured to notify a user if a video call should not or cannot be placed at a certain time, such as, but not limited to, when the real-time network performance information indicates congestion that would affect the quality of a video call or when the call is made during peak hours, thereby costing more than a user pre-specified cost threshold.

Accordingly, the above description enables a system and method for initiating a video phone call using a standard non-video phone device. Advantages of the disclosed embodiments include, but are not limited to, enabling older generations or non-technical/non-Internet savvy people to initiate video calls using their standard phone devices.

It is understood by those skilled in the art that each of the devices described in FIGS. 2 and 3 may comprise of one or more processors, logic, and data storage components (e.g., memory, hard disk drives) that are operable to store and execute data and computer executable instructions to performing the functions of the disclosed embodiments. In addition, each of the devices may include one or more wired or wireless network interface components and input/output components for enabling communications with other devices.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts of the disclosed embodiments.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof.

In addition, while the above description describes various embodiments, the disclosed description is not intended to limit the structure or implementation of the disclosed embodiments. One of ordinary skill in the art would recognize that various modifications may be made and that the teachings disclosed herein may be implemented in various forms and may be applied to numerous applications. For instance, the steps illustrated in the process shown in FIG. 1 may be modified by deleting one or more steps, adding one or more steps, and/or combining one or more the steps. For example, while FIG. 1 depicts the steps of receiving an outgoing call request (step 102) and receiving a phone number or identifier associated with a called party (step 108) as two separate steps, the steps may be combined into one. For example, the outgoing call request may include the phone number or identifier associated with a called party. For instance, a caller wishing to initiate a video call may dial *TV+the called number, the switch or other devices could be configured to recognize the *TV code and parse out the called number.

Moreover, the number and types of devices illustrated in FIG. 2 are presented merely as an example and are not intended to limit the scope of the claimed inventions. For instance, although the example illustrates the same switch in direct communication with both the devices at location 210 and location 280, one of ordinary skill in the art would recognize that there may be numerous switches along a communication path. Similarly, the subscribers' IMS terminals such as the router/access point 220 may be connected to different CSCF servers and/or SBC servers.

Other such modifications and variations of the present teachings are intended by to fall within the scope of the appended claims.

We claim:

1. A method for initiating a video phone call from a first party to a second party, the method comprising:
   receiving a call from the first party, the call initiated using a standard phone device;
   determining whether the call is a voice call or a call request to initiate a video call;
   responsive to a determination that the call is a call request to initiate a video call:
     terminating the call;
     calling a video phone device of the first party, wherein the video phone device is selected based on one or more of a user preference, a real time network performance of the video phone device, an importance of the second party to the first party, or a physical location of the video phone device closest to the standard phone device;
     calling a communication device of the second party; and
     establishing a communication session between the video phone device of the first party and the communication device of the second party.

2. The method of claim 1, wherein the call is received over a public switched phone network.

3. The method of claim 1, wherein calling the communication device of the second party comprises calling only video phone devices of the second party.

4. The method of claim 1, wherein calling the communication device of the second party comprises calling both video phone devices and standard phone devices of the second party.

5. The method of claim 4, wherein the communication session is an audio only communication session in response the second party answering one of the non-video phone devices.

6. The method of claim 4, wherein the communication session is an audio and video communication session in response the second party answering one of the video phone devices.

7. The method of claim 1, wherein determining whether the call is a voice call or a call request to initiate a video call comprises identifying a pre-specified code or number.

8. The method of claim 7, further comprising utilizing an off-hook delay trigger in identifying the pre-specified code or number in response receiving to the call over a public switched phone network.

9. The method of claim 7, further comprising utilizing an Internet Protocol (IP) Multimedia Subsystem in identifying the pre-specified code or number in response to receiving the call over an Internet Protocol (IP) network.

10. The method of claim 7, wherein the pre-specified code is *TV or equivalently *88.

11. The method of claim 1, further comprising:
    requesting a number for the second party from the first party prior to terminating the call; and
    determining call identifiers of other communication devices of the second party based on the number.

12. The method of claim 1, further comprising determining the video phone device of the first party to call based on a pre-specified video call setting.

13. The method of claim 1, wherein calling the communication device of the second party is performed after the first party answers the video phone device.

14. The method of claim 1, further comprising processing the call as usual in response to a determination that the call is a voice call.

15. A system for initiating a video phone call from a first party to a second party, the system comprising:
    a network interface for receiving a call from the first party, the call initiated using a standard phone device;
    memory for storing computer executable instructions; and
    a processor that executes the computer executable instructions for:
      determining whether the call is a voice call or a call request to initiate a video call; and
      responsive to a determination that the call is a call request to initiate a video call:
        terminating the call;
        calling a video phone device of the first party, wherein the video phone device is selected based on one or more of a user preference, a real time network performance of the video phone device, an importance of the second party to the first party, or a physical location of the video phone device closest to the standard phone device;
        calling a communication device of the second party; and
        establishing a communication session between the video phone device of the first party and the communication device of the second party.

16. The system of claim 15, wherein calling the communication device of the second party comprises calling both video phone devices and standard phone devices of the second party.

17. The system of claim 15, wherein determining whether the call is a voice call or a call request to initiate a video call comprises identifying a pre-specified code or number.

18. The system of claim 15, wherein the processor further executes the computer executable instructions for requesting a number for the second party from the first party prior to terminating the call.

19. The system of claim 18, wherein the processor further executes the computer executable instructions for determining call identifiers of other communication devices of the second party based on the number.

20. A computer program product comprising a computer usable non-transitory medium having a computer readable program code embodied therein, the computer readable program code comprising instructions to:
- determine whether the call received from a standard phone device of a first party is a voice call or a call request to initiate a video call; and
- responsive to a determination that the call is a call request to initiate a video call:
- terminate the call;
- call a video phone device of the first party, wherein the video phone device is selected based on one or more of a user preference, a real time network performance of a video phone device, an importance of a second party to the first party, or a physical location of the video phone device closest to the standard phone device;
- call a communication device of the second party; and
- establish a communication session between the video phone device of the first party and the communication device of the second party.

* * * * *